(12) United States Patent
Manceau et al.

(10) Patent No.: US 6,922,662 B2
(45) Date of Patent: Jul. 26, 2005

(54) METHOD FOR MODELLING FLOWS IN A FRACTURED MEDIUM CROSSED BY LARGE FRACTURES

(75) Inventors: Emmanuel Manceau, Rueil-Malmaison (FR); Sylvain Sarda, Rueil-Malmaison (FR); Luca Cosentino, La Celle Saint Cloud (FR); Marie-Christine Cacas, Rueil-Malmaison (FR); Bernard Bourbiaux, Rueil-Malmaison (FR)

(73) Assignee: Institut Francais du Petrole, Rueil-Malmaison cedex (FR)

( * ) Notice: Subject to any disclaimer, the term of this patent is extended or adjusted under 35 U.S.C. 154(b) by 801 days.

(21) Appl. No.: 09/860,616

(22) Filed: May 21, 2001

(65) Prior Publication Data

US 2002/0016702 A1 Feb. 7, 2002

(30) Foreign Application Priority Data

May 26, 2000 (FR) .............................................. 00 06874

(51) Int. Cl.$^7$ .............................. G06F 7/48; G06F 17/10
(52) U.S. Cl. ................................. 703/10; 702/12; 703/2
(58) Field of Search ........................... 703/2, 10; 702/6, 702/11–13; 73/152.02

(56) References Cited

U.S. PATENT DOCUMENTS

| 5,659,135 | A | * | 8/1997 | Cacas ...................... 73/152.02 |
| 6,023,656 | A | * | 2/2000 | Cacas et al. ................... 702/12 |
| 6,094,619 | A | * | 7/2000 | Noetinger et al. ............. 702/12 |
| 2003/0216898 | A1 | * | 11/2003 | Basquet et al. ............... 703/10 |

FOREIGN PATENT DOCUMENTS

| FR | 2 757 947 | 7/1998 |
| FR | 2 767 957 | 7/1998 |

OTHER PUBLICATIONS

Arbogast, T. Analysis of the Simulation of Single Phase Flow Through a Naturally Fractured Reservoir, 1989 Society for Industrial and Applied Mathematics, vol. 26, No. 1, Feb. 1989, pp. 12–29.*

Douglas Jr. et al., J. A Dual–Porosity Model for Waterflooding in Naturally Fractured Reservoirs, Computer methods in Applied Mechanics and Engineering, vol. 87, No. 2–3, Jun. 1991, pp. 157–74.*

(Continued)

*Primary Examiner*—Russell Frejd
(74) *Attorney, Agent, or Firm*—Antonelli, Terry, Stout & Kraus, LLP

(57) ABSTRACT

A method for modelling flows in a fractured medium crossed by a network of fluid conducting objects of definite geometry but not homogenizable on the scale of each grid cell of the model (large fractures, sub-seismic faults for example, very permeable sedimentary layers, etc.) which has an application in the evaluation of hydrocarbon reservoirs is disclosed. The method allows simulation fluid of flows in a fractured porous geologic medium of known structure that is discretized with a grid and modelled by considering that each elementary volume of the fractured geologic medium is an equivalent fracture medium and matrix medium on the scale of each cell between which fluid exchanges are determined. The method determines exchanges between the matrix medium and the fracture medium, and modeles the transmissivities of the various cells crossed by each conducting object, so that the resulting transmissivity corresponds to the direct transmissivity along each conducting object. Explicit modelling of these objects, which is prohibitive on the scale of a field because of the very large number of cells involved and of the numerical constraints, is therefore unnecessary.

6 Claims, 2 Drawing Sheets

OTHER PUBLICATIONS

Sahimi, M. Flow Phenomena in Rocks: From Continuum Models to Fractals, Percolation, Cellular Automata, and Simulated Annealing, Reviews of Modern Physics, vol. 65, No. 4, Oct. 1993, pp. 1393–534.*

Sameh et al., A.H. Large Scale Simulation of Particulate Flows, 13th International and 10th Symposium on Parallel and Distributed Processing, Apr. 1999, pp. 660–666.*

* cited by examiner

METHOD FOR MODELLING FLOWS IN A FRACTURED MEDIUM CROSSED BY LARGE FRACTURES

BACKGROUND OF THE INVENTION

1. Field of the Invention

The present invention relates to a method for modelling fluid flows in a fractured medium crossed by relatively large fractures, as specified hereafter.

2. Description of the Prior Art

In a reservoir under production, the pressure and flow rate conditions imposed for the producing and injection wells induce flows of the fluids in place in the reservoir (oil, gas and water). Simulation of these flows determines the evolution of the pressures and of the saturations in the reservoir in the course of time. Because of the very heterogeneous nature of fractured reservoirs, the fluids move relatively fast through the network of fractures and much more slowly in the matrix. Simulation of flows in the context of a fractured reservoir therefore requires a very good representation of the major heterogeneities formed by the fractures. The accuracy of this representation depends on the type of simulation used and on the size of the fractures to be modelled. Thus, very precise simulation of a well test requires representation of the exact geometry of the fractures network. Conversely, taking into account a dense network of small fractures on the scale of a field will involve an equivalent simplified representation.

Currently, the petroleum industry notably uses double-porosity (double medium) models for simulating flows in fractured mediums, which are not applied to the real geologic medium in all its complexity but to a homogenized representation, according to the reservoir model referred to as double medium model described for example by Warren and Root in "The Behavior of Naturally Fractured Reservoirs", SPE Journal, 1963. Any elementary volume of the fractured reservoir is considered to be two equivalent homogeneous mediums on the scale of the simulator grid cell: a fracture medium and a matrix medium. On the scale of the reservoir, the fluids flow mainly through the fracture medium and fluid exchanges occur locally between the fractures and the matrix blocks. This representation, which does not show the complexity of the network of fractures in a reservoir, is however efficient at the level of a reservoir grid cell whose dimensions are typically 100 m×100 m. Double medium modelling allows reproduction of the flow behavior of the two mediums and their interactions without requiring explicit modelling of the two mediums.

French Patent 2,757,947 and corresponding U.S. Pat. No. 6,023,656 filed by the assignee describe a technique for determining the equivalent fracture permeability of a network of fractures in an underground multi-layer medium from a known representation of this network. This technique allows systematical connection of fractured reservoir characterization models to double-porosity simulators in order to obtain a more realistic modelling of a fractured underground geologic structure.

French Patent 2,757,957 filed by the assignee describes a technique allowing a simplified modelling of a porous heterogeneous geologic medium (such as a reservoir crossed by an irregular network of fractures for example) in form of a transposed or equivalent medium, so that the transposed medium is equivalent to the original medium, in relation to a determined type of physical transfer function (known for the transposed medium).

French Patent application 98/15,727 filed by the assignee also describes a method for modelling fluid flows in a fractured multi-layer porous medium by taking into account the real geometry of the network of fractures and the local exchanges between the porous matrix and the fractures at each node of the network. The fractured medium is discretized by means of a grid, the fracture cells are centered on the nodes at the various intersections of the fractures, each node being associated with a matrix volume, and the flows between each fracture cell and the associated matrix volume are determined in a pseudosteady state.

There are cases where the previous techniques are difficult to implement, in the presence of an medium crossed by large fractures or sub-seismic faults whose hydraulic behavior cannot be homogenized on the scale of the cell. Explicit modelling of these objects is therefore necessary a priori, but their large number makes such an approach prohibitive on the scale of a field (too large number of cells and numerical constraints). The same problem arises for reservoirs containing thin and very permeable layers whose behavior is similar to that of large horizontal fractures.

SUMMARY OF THE INVENTION

The modelling method according to the invention allows simulation of fluid flows in a fractured porous geologic medium of known structure that is discretized with a grid and modelled by considering that each elementary volume of the fractured geologic medium is an equivalent fracture medium and matrix medium on the scale of each cell, between which fluid exchanges are determined. This geologic medium is crossed by a network of fluid conducting objects of definite geometry but which cannot be homogenized on the scale of each cell of the model (large fractures, sub-seismic faults for example, very permeable sedimentary layers, etc.). The method comprises determining exchanges between the matrix medium and the fracture medium, and modelling the transmissivities of the various cells crossed by each conducting object, so that the resulting transmissivity corresponds to the direct transmissivity along this conducting object.

In cases where the conducting objects are very permeable sedimentary layers, the transmissivity between the cells crossed by each very permeable layer is assigned a value depending on the dimensions of the cells and on the common contact area between layers at the junction of adjacent cells.

In cases where the conducting objects are fractures, the transmissivity between cells crossed by each fracture is assigned a transmissivity depending on the dimensions of the cells and on the common surface area of the fracture at the junction of adjacent cells.

In all the cells crossed by geometrically defined conducting objects (matrix blocks of irregular shapes and sizes), a transposed medium is determined, which comprises a set of evenly arranged blocks separated by a regular fracture grid giving substantially the same fluid recovery unction during a capillary imbibition process as the real medium. The vertical dimension of the blocks of the transposed medium is calculated from the positions of the very permeable sedimentary layers in the cell and the horizontal dimensions of the blocks of this transposed medium are obtained from a two-dimensional (2D) image of the geologic medium in form of a series of pixels, by:

determining, for each pixel, the minimum distance to the closest fracture;
  forming a distribution of the number of pixels in relation to the minimum distance to the fractured medium and determining, from this distribution, the recovery function (R) of the set of blocks; and determining dimensions of the equivalent irregular blocks of the transposed medium from recovery (R) and from the recovery of the equivalent block.

The method of the invention can be implemented for example in oil production by reservoir engineers in order to obtain reliable flow predictions for oil reservoirs with structural or sedimentary discontinuities whose flow properties contrast with the surrounding medium.

The modelling of the invention simulates flows in a permeable porous medium (reservoir) crossed by a network of fractures and/or of thin layers much more conducting than the porous matrix. Fractured reservoirs are an extreme type of heterogeneous reservoirs comprising two contrasting mediums, a matrix medium containing most of the oil in place and having a low permeability, and a fractured medium representing less than 1% of the oil in place and highly conducting. The fractured medium itself can be complex, with various sets of fractures characterized by their respective density, length, orientation, dip and opening.

The present invention allows precise simulation of flows on the scale of a field in the presence of many large fractures.

BRIEF DESCRIPTION OF THE DRAWINGS

Other features and advantages of the method according to the invention will be clear from reading the description hereafter of a non limitative example, with reference to the accompanying drawings wherein.

DETAILED DESCRIPTION

The example of a porous reservoir crossed by a network of fractures F (FIG. 2) assumed to be vertical for simplification reasons and by thin sedimentary levels (sub-horizontal) L (FIG. 1) whose petrophysical properties (permeability notably) contrast with the matrical surrounding medium is described hereafter. This reservoir is modelled in form of two "superimposed" grids (double medium model), one of which, referred to as "matrix", representing the surrounding matrix medium, the other, referred to as "fracture", representing all the discontinuities considered (fractures and permeable thin levels). The flows are calculated within the matrix grid and the fracture grid respectively. Furthermore, exchange terms connect the unknowns of each pair of matrix and fracture cells of the model by means of suitable formulations. The method described hereafter allows calculation of the transmissivities between "fracture" cells and the "matrix-fracture" exchanges. Exchanges between the matrix cells are calculated in a conventional way well-known to those skilled in the art.

I Transmissivities Between "Fracture" Cells

I-1 Transmissivities Associated with the Thin and Permeable Sedimentary Levels

The thin and permeable sedimentary levels are included in the "fracture" medium of the double medium model. In a cell crossed by such sedimentary levels, the petrophysical properties of these levels (porosity, permeability, water saturation) are allotted to the fracture medium of the cell and the properties of the rest of the rock contained in the cell are allotted to the matrix medium of this cell.

Figure 1:
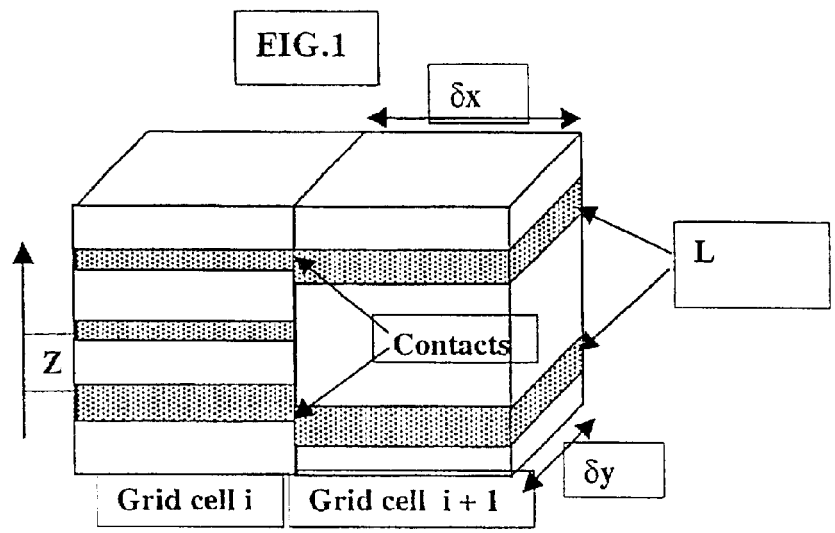
FIG. 1 diagrammatically shows two adjacent cells of the same layer of a reservoir grid where the presence of thin and very permeable sedimentary levels induces a horizontal transmissivity in the "fracture" medium.
Figure 2:
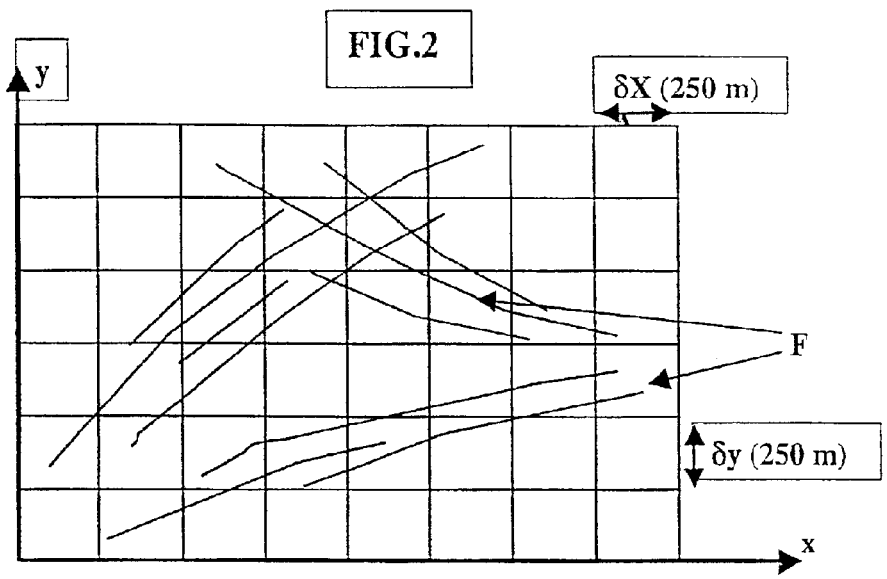
FIG. 2 shows a reservoir grid crossed by a network of fractures.

The presence of thin and very permeable levels in two adjacent cells induces a horizontal transmissivity in the "fracture" medium between the two cells ("fracture—fracture" transmissivity). The diagram of FIG. 1 shows two adjacent cells (in the same layer of the reservoir grid) containing such levels. It can be noted that there is no induced vertical "fracture—fracture" transmissivity since the levels are horizontal.

In this example, the horizontal "fracture—fracture" transmissivity between cells i $$Ts_{i,i+1} = \frac{Ks \cdot Es_{i,i+1} \cdot \Delta Y}{\Delta X}$$

and i+1 is calculated as follows:
where:
Ks is the permeability of the very permeable sedimentary levels,
•Y is the size of the cells at Y,
•X is the size at X, and
$Es_{i,i+1}$ is the thickness of the contacts between thin and very permeable sedimentary levels of the two adjacent cells i and i+1.

This thickness is zero if the levels of the two cells are not connected. Conversely, if two cells are totally connected, it can be equal to the smallest of the cumulated thicknesses in the two cells.

I-2 Transmissivities Associated with the Fractures

The network of vertical fractures is also taken into account in the "fracture" medium of the double medium approach. In each layer of the reservoir model (FIG. 2), this network can be represented by a series of fracture segments that cross the reservoir grid, as shown hereafter:

The data relative to these fracture segments is:
the fracture permeability Kf,
the fracture thickness Ef, and
the fracture length Lf.

The fracture porosity Φf is calculated with the following formula:

$$\Phi f = \frac{Lf \cdot Ef}{\Delta X \cdot \Delta Y}$$

Figure 3:
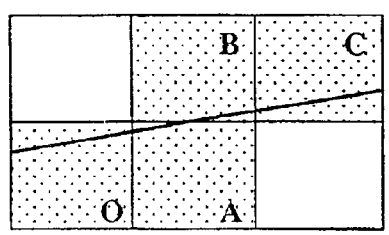
FIG. 3 shows cells O, A, B, C of a reservoir crossed by a fracture that is modelled by fracture—fracture transmissivities.

The communication between the cells of the reservoir through the network of fractures is modelled by fracture—fracture transmissivities. In the example of FIG. 3, fracture—fracture transmissivities are calculated between the cells crossed by the fracture, i.e. for pairs O and A, A and B, B and C: $T_{FOA}$, $T_{FAB}$ and $T_{FBC}$.

This example shows that the real path of a flow through a fracture can be far from the path imposed by modelling, which passes through the centers of cells O, A, B and C. The solution of replacing the fracture segment by a broken line passing through the centers of the cells would lead to a poor simulation of the flows through these cells.

Figure 4:
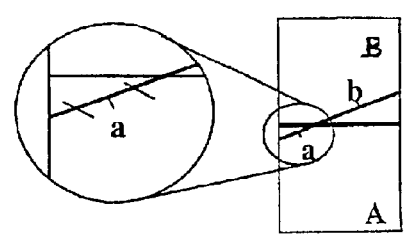
FIG. 4 illustrates the method of calculating the transmissivity between two cells A and B crossed by a fracture.

The horizontal "fracture—fracture" transmissivity between two cells crossed by the same fracture (see FIG. 4) is therefore determined as follows:
where:
Kf is the intrinsic permeability of the fracture,
Ef is the thickness of the fracture,
•Z is the thickness of the layer,
$L_{ab}$ is the length of segment ab,
a is the mid-point of the fracture segment crossing cell A, and
b is the mid-point of the fracture segment crossing cell B.

It can be noted that the smaller length $L_{ab}$, the higher the <<fracture—fracture>> transmissivity between cells A and B. The grid effect that imposes an echelon type path on the flow is thus numerically corrected.

Figure 5:
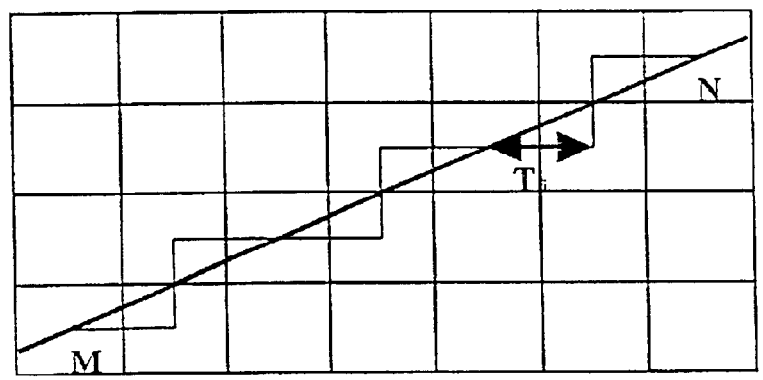
FIG. 5 shows, by way of comparison, the echelon type path through the cells crossed by an oblique fracture, that is taken into account for the purpose of simulation, and whose transmissivity, according to the calculation method selected, is however equivalent to the real transmissivity directly along the fracture.

The flow between two distant cells connected by a fracture can thus be correctly simulated despite the echelon type path (FIG. 5) imposed by the grid. In fact, in the $$\sum \frac{1}{T_{fi}} = \frac{1}{T_{fMN}}$$

example of FIG. 5, it can be verified that:
where $T_{fi}$ are the "fracture—fracture" transmissivities between cartesian reservoir cells along the echelon type path connecting M and N, and $T_{fMN}$ is the real transmissivity of the fracture between M and N.

Concerning the vertical "fracture—fracture" transmissivity induced by the presence of a fracture crossing several layers of the reservoir:

$$T_{fV} = Kf \cdot Ef \cdot \frac{Lf}{\Delta Z}$$

where:
Kf is the intrinsic permeability of the fracture,
Ef is the thickness of the fracture,
•Z is the thickness of the layer,
$L_f$ is the length of the fracture segment in the cell considered.

Finally, when several fractures cross a cell, the transmissivities calculated for these fractures taken individually are added.

I-3 Resulting Transmissivity

The transmissivities relative to the very permeable sedimentary levels ($T_s$) and the transmissivities relative to the fractures ($T_f$) are calculated separately with the aforementioned methods. The "fracture—fracture" transmissivities of the final double medium model are simply calculated by addition of $T_s$ and $T_f$.

Similarly, the final porosity of the "fracture" medium in each cell is the sum of the porosities due to the very permeable sedimentary levels on the one hand and to the fractures on the other hand.

II Dimensions of the Equivalent Matrix Block
II-1 Horizontal Dimensions

The horizontal dimensions of the equivalent block (a, b) are controlled by the vertical fractures present in the reservoir. In fact, the "matrix-fracture" exchanges due to the vertical fractures are only horizontal.

In each cell crossed by at least one fracture, these horizontal dimensions are calculated with the method described in the aforementioned French patent 2,757,957. For cells containing no fractures, the horizontal dimensions of the equivalent block are infinite. Practically, a very great value is assigned thereto (10 km for example). According to this method, the equivalent block dimensions are determined by identifying behaviors of the real fractured medium and of the equivalent medium for a two-phase water-oil imbibition mechanism. This matches the oil recovery function R(t) (of the real fractured medium) obtained by means of an image processing method (described below) with the recovery function Req(t) of the equivalent medium whose analytical expression is known and depends on the dimensions of the equivalent block.

II-1-a) Geometrical Formulation

The fractures are defined by the co-ordinates of their end points on a two-dimensional section XY of a layer, the imbibition process through which water is present in the fractures and oil is present in the matrix blocks has to be determined. It is assumed that the invasion of the matrix by water is of a "piston" type. It is assumed that function x=f(t), which connects the progression of the water front to time, is the same for all the matrix blocks, whatever their form, and for all the elementary blocks. Consequently, matching functions R(t) and Req(t) is equivalent to matching functions R(x) and Req(x). These functions physically define normalized zones invaded by water according to the progression of the imbibition front in the fractured medium.

In 2D, the analytical expression for Req(x) is as follows:
where a and b are the dimensions of the rectangular block or equivalent square (a and b>

$$\begin{cases} Req(x) = 1 - \frac{1}{a \times b}(a - 2x)(b - 2x) = 2\left(\frac{1}{a} + \frac{1}{b}\right)x - \frac{4}{a \times b}x^2, \\ x \in \left[0, \min\left(\frac{a}{2}, \frac{b}{2}\right)\right] \\ Req(x) = 1, x > \min\left(\frac{a}{2}, \frac{b}{2}\right) \end{cases}$$

0).

Function R(x) has no analytical expression. It is calculated from a discretization of section XY of the layer studied according to the algorithm defined hereafter.

II-1-b) Algorithm for Calculating Function R(x)

Figure 7:
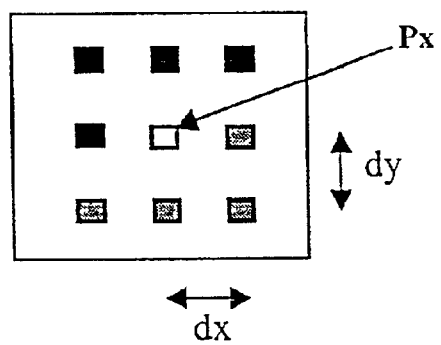
FIG. 7 shows an example of neighboring pixels used for calculation of the value assigned to a pixel.

Section XY of the layer studied is considered to be an image each pixel of which represents a surface element. These pixels are regularly spaced out by an interval dX in direction X and dY in direction Y (FIG. 7). The algorithm used allows determination, for each pixel of this image, of the minimum distance that separates the pixel from the closest fracture.

The image is expressed by a two-dimensional real numbers table: Pict[0:nx+1,0:ny+1] where nx and ny are the numbers of pixels of the image in directions X and Y. In practice, the total number of pixels (nx.ny) is for example of the order of one million. The values of the elements of table Pict are the distances sought.

Initialization: All the pixels through which a fracture passes are at a zero distance from the closest fracture. For these pixels, table Pict is thus initialized at value 0. This is done with an algorithm known in the art (the Bresline algorithm for example) which is given the co-ordinates of the pixels corresponding to the two ends of a fracture considered as a segment of a line and which initializes (at 0 in the present case) the closest pixels. The other elements of Pict are initialized at a value greater than the greatest distance existing between two pixels of the image. This value is for example nx.dX+ny.dY.

Calculation: For a given pixel, the distance to the closest fracture is calculated from the distance values that have already been calculated for the neighboring pixels. It is assigned a value which, if it is less than the value that has been initially assigned thereto, is the minimum of the values of the neighboring pixels to which the distance of these pixels to the pixel considered is added.

This calculation is carried out in two successive stages. During the descending pass, the image is scanned line by line, from top to bottom and from left to right (from Pict[1,1] to Pict [nx,ny]). The pixels that are taken into account are different according to whether the pass is descending or ascending. As shown in FIG. 7, the black and the grey pixels are those taken into account respectively during the descending passes and the ascending passes, for pixel Px.

The oblique distance dxy being defined as: dxy= $\sqrt{dx^2+dy^2}$, the algorithm is written as follows:

```
        for j=1 to ny
          for i=1 to nx
|   |       Pict[i,j] = min   Pict[i-1,j] + dx,    : descending pass
|   |                         Pict[i-1,j-1] + dxy,
|   |                         Pict[i,j-1] + dy,
|   |                         Pict[i+1,j-1] + dxy,
|   |                         Pict[i,j]
|          end of loop on i
        end of loop on j
          for j=ny to 1,
            for i=1x to 1,
|   |       Pict[i,j] = min   Pict[i+1,j] + dx,    : descending pass
|   |                         Pict[i+1,j+1] + dxy,
|   |                         Pict[i,j+1] + dy,
|   |                         Pict[i-1,j+1] + dxy,
|   |                         Pict[i,j]
|          end of loop on i
        end of loop on j.
```

Bar graph: From the table Pict thus calculated, it is possible to build a bar graph by classifying the non zero values (those assigned to the pixels outside the fractures) in increasing order.

The cumulated result of the bar graph gives, for any distance delimiting two intervals of the bar graph, the number of non zero pixels whose value is less than this distance. In the application described for a fractured porous medium where this distance corresponds to the progression of the water front, the cumulated result of the bar graph thus shows the surface area invaded by water. Curve R(x) is obtained by dividing this cumulated result by the total number of non zero pixels (so as to normalize it). The number of intervals used in abscissa for the bar graph corresponds to the number of discretization points of curve R(x). It is selected equal to 500 for example.

II-1-c) Seeking the Dimensions of the Equivalent Block

At this stage, function R(x) is known and parameters ($\bar{a}$, $\bar{b}$) are sought (dimensions of the equivalent block that minimize the functional):

$$J(a, b) = \sum_{i=1}^{N} (R(x_i) - Req - a, b, x_i)^2$$

where N is the number of discretization points of R(x) and ($x_i$) are the abscissas of these discretization points.

Discretization on the Ordinate of R(x)

Figure 8:
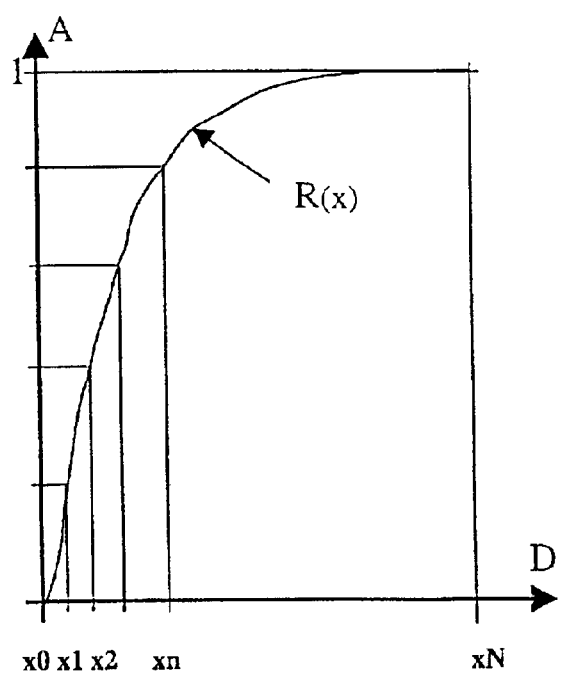
FIG. 8 shows a possible variation of an invaded normalized zone according to the distance to the fractures.

In order to give equal weight to all the volumes of oil recovered during imbibition, curve R(x) is re-discretized with a constant interval on the ordinate axis (FIG. 8). The series ($x_i$) used by the functional is deduced from this discretization.

Minimization of the Functional

Since a and b play symmetrcial parts in the expression Req(a,b,x), the functional as follows is in fact used:

$$\tilde{J}(u, v) = \sum_{i=1}^{N} \left( R(x_i) - \tilde{Req}(u, v, x_i) \right)^2$$

$$\text{with} \begin{cases} \tilde{Req}(u, v, x) = u \times x + v \times x^2 \text{ i.e.} \begin{cases} u = 2 \times \left( \frac{1}{a} + \frac{1}{b} \right) \\ v = \frac{-4}{a \times b} \end{cases} \\ \tilde{Req}(u, v, x) \leq 1 \end{cases}$$

Minimizing this functional amounts to finding the pair ($\bar{u}$, $\bar{v}$) for which $\tilde{J}'(\bar{u},\bar{v})=0$. This is done by means of a Newtonian algorithm.

Then, the pair ($\bar{a},\bar{b}$) sought is deduced from ($\bar{u},\bar{v}$). Three cases can present themselves:

1) $\bar{v}>0$ means that one of the values of pair ($\bar{a},\bar{b}$) is negative, which has no physical sense. We then put v=0 in the expression of $\tilde{Req}$(u, v, x), which implies that the fractures are parallel. The operation is repeated and pair ($\bar{a},\bar{b}$) is calculated as follows:

2) The case $\bar{u}^2+4\bar{v}<0$ is also physically meaningless since it means that $$\begin{cases} \bar{a} = \begin{cases} a = \frac{2}{\bar{u}} \\ \frac{4}{\bar{b}} \quad inf \; ini \\ u \end{cases} \\ \bar{b} = \bar{a} \end{cases}$$

($\bar{a},\bar{b}$) are not real. Then $u^2+4v$ is set to zero, which imposes that the elementary block which is sought has the shape of a square (a=b). After minimization, pair ($\bar{a},\bar{b}$) is calculated as follows:

3) For the other values of pair ($\bar{u},\bar{v}$), we have:

II-2 Vertical Dimension

Figure 6:
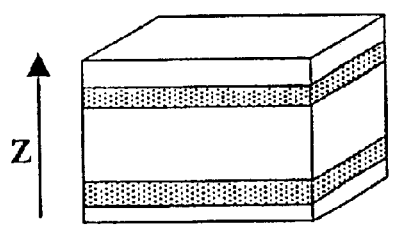
FIG. 6 illustrates the method of calculating the size of an equivalent block according to the number of very permeable sedimentary levels crossing a cell.

The vertical dimension (c) of the equivalent block is controlled by the thin and $$\begin{cases} \bar{a} = \frac{-\bar{u} + \sqrt{\bar{u}^2 + 4\bar{v}}}{\bar{v}} \\ \bar{b} = \frac{-\bar{u} - \sqrt{\bar{u}^2 + 4\bar{v}}}{\bar{v}} \end{cases}$$

very permeable horizontal sedimentary levels (FIG. 6). The "matrix-fracture" exchanges resulting from these levels are in fact only vertical.

In each cell crossed by at least one very permeable level, the vertical dimension of the equivalent block is calculated with the following formula:

$$c = \frac{\Delta Z}{Ns}$$

where •Z is the thickness of the cell and Ns is the number of distinct very permeable sedimentary levels in the cell. For example, in the following pattern, Ns is 2:

For cells in which there are no very permeable thin levels, the height of the equivalent block is infinite. In practice, a very great value is also assigned thereto (10 km for example).

What is claimed is:

1. A computer implemented modelling method allowing simulation of fluid flows in a fractured porous geologic medium of known structure that is discretized with a grid and modelled by considering that each elementary volume of the fractured geologic medium is an equivalent fracture medium and matrix medium on the scale of each cell between which fluid exchanges are determined, the geologic medium being crossed by a network of fluid conducting objects of a geometry which cannot be homogenized on the scale of each cell of the model, comprising determining exchanges between the matrix medium and the fracture medium, wherein transmissivities of cells crossed by each conducting object are modelled, along each conducting object and depend on dimensions of the cells, on at least one geometrical characteristic of each conducting object and on permeability of each conducting object.

2. A method as claimed in claim 1, wherein the fluid conducting objects are permeable sedimentary layers and the at least one geometrical characteristic is a common contact area between layers at a junction of adjacent cells.

3. A method as claimed in claim 1, wherein the fluid conducting objects are fractures and the at least one geometrical characteristic is a thickness of the fractures.

4. A method as claimed in claim 1, wherein in cells crossed by fluid conducting objects, a transposed medium is determined by a set of evenly arranged sets of blocks separated by a regular fracture grid, the transposed medium providing substantially a same fluid recovery (Req) during a capillary imbibition process as a real medium, a vertical dimension of the blocks of the transposed medium being determined from positions of permeable sedimentary layers in the cell and horizontal dimensions of the blocks of the transposed medium being obtained from a two-dimensional (2D) image of the geologic medium in form of a series of pixels, by:

determining, for each pixel, a minimum distance to a closest fracture;

forming a distribution of a number of pixels in relation to the minimum distance to the fractured medium and determining, from the distribution, a recovery function (R) of the set of blocks; and determining dimensions of equivalent regular blocks of the transposed medium from recovery and from a recovery of the equivalent block.

5. A method as claimed in claim 2, wherein in cells crossed by fluid conducting objects, a transposed medium is determined by a set of evenly arranged sets of blocks separated by a regular fracture grid, the transposed medium providing substantially a same fluid recovery (Req) during a capillary imbibition process as a real medium, a vertical dimension of the blocks of the transposed medium being determined from positions of permeable sedimentary layers in the cell and horizontal dimensions of the blocks of the transposed medium being obtained from a two-dimensional (2D) image of the geologic medium in form of a series of pixels, by:

determining, for each pixel, a minimum distance to a closest fracture;

forming a distribution of a number of pixels in relation to the minimum distance to the fractured medium and determining, from the distribution, a recovery function (R) of the set of blocks; and determining dimensions of equivalent regular blocks of the transposed medium from recovery and from a recovery of the equivalent block.

6. A method as claimed in claim 3, wherein in cells crossed by fluid conducting objects, a transposed medium is determined by a set of evenly arranged sets of blocks separated by a regular fracture grid, the transposed medium providing substantially a same fluid recovery (Req) during a capillary imbibition process as a real medium, a vertical dimension of the blocks of the transposed medium being determined from positions of permeable sedimentary layers in the cell and horizontal dimensions of the blocks of the transposed medium being obtained from a two-dimensional (2D) image of the geologic medium in form of a series of pixels, by:

determining, for each pixel, a minimum distance to a closest fracture;

forming a distribution of a number of pixels in relation to the minimum distance to the fractured medium and determining, from the distribution, a recovery function (R) of the set of blocks; and determining dimensions of equivalent regular blocks of the transposed medium from recovery and from a recovery of the equivalent block.

* * * * *